United States Patent [19]

Sicking et al.

[11] Patent Number: 4,475,116

[45] Date of Patent: Oct. 2, 1984

[54] INK PRINTER EQUIPPED WITH AN INK PRINTING HEAD AND INTERMEDIATE INK CONTAINER DISPOSED ON A MOVABLE CARRIAGE

[75] Inventors: Heinrich Sicking, Schortens; Ehrenfried Loock, Wilhelmshaven, both of Fed. Rep. of Germany

[73] Assignee: Olympia Werke AG, Wilhelmshaven, Fed. Rep. of Germany

[21] Appl. No.: 417,894

[22] Filed: Sep. 14, 1982

[30] Foreign Application Priority Data

Sep. 24, 1981 [DE] Fed. Rep. of Germany ....... 3137970

[51] Int. Cl.[3] ............ G01D 15/18

[52] U.S. Cl. ............ 346/140 R

[58] Field of Search ............ 346/140 R, 75

[56] References Cited

U.S. PATENT DOCUMENTS

| | | | |
|---|---|---|---|
| 3,747,120 | 7/1973 | Stemme . | |
| 3,771,165 | 11/1973 | Kurimoto et al. . | |
| 3,787,884 | 1/1974 | Demer | 346/140 X |
| 3,871,004 | 3/1975 | Rittberg . | |
| 3,967,286 | 6/1976 | Andersson et al. . | |
| 4,124,853 | 11/1978 | Kattner | 346/140 |
| 4,144,537 | 3/1979 | Kimura et al. . | |
| 4,342,042 | 7/1982 | Cruz-Uribe | 346/140 |
| 4,394,669 | 7/1983 | Ozawa | 346/140 |

FOREIGN PATENT DOCUMENTS

| | | |
|---|---|---|
| 2336485 | 2/1977 | Fed. Rep. of Germany . |
| 2742633 | 4/1979 | Fed. Rep. of Germany . |

OTHER PUBLICATIONS

Greene, J.; Pressure Surge Accumulator; IBM TDB, vol. 15, No. 3, Aug. 1972, p. 766.

*Primary Examiner*—Joseph W. Hartary
*Attorney, Agent, or Firm*—Spencer & Frank

[57] ABSTRACT

A printing apparatus which comprises a carriage that is movable along a record carrier, an ink printing head for applying ink to the record carrier, and a stationary reservoir mounted adjacent the carriage for storing ink to be applied to the carrier. An intermediate container which, together with the ink printing head, is attachable to the carrier is flow-connected to the ink printing head for supplying ink obtained from the reservoir. The intermediate container includes a hollow housing having upper and lower portions defining an ink storage chamber and a bladder containing air which is suspended within the ink storage chamber, the interior of the bladder being connected to the atmosphere through an opening in the housing.

11 Claims, 4 Drawing Figures

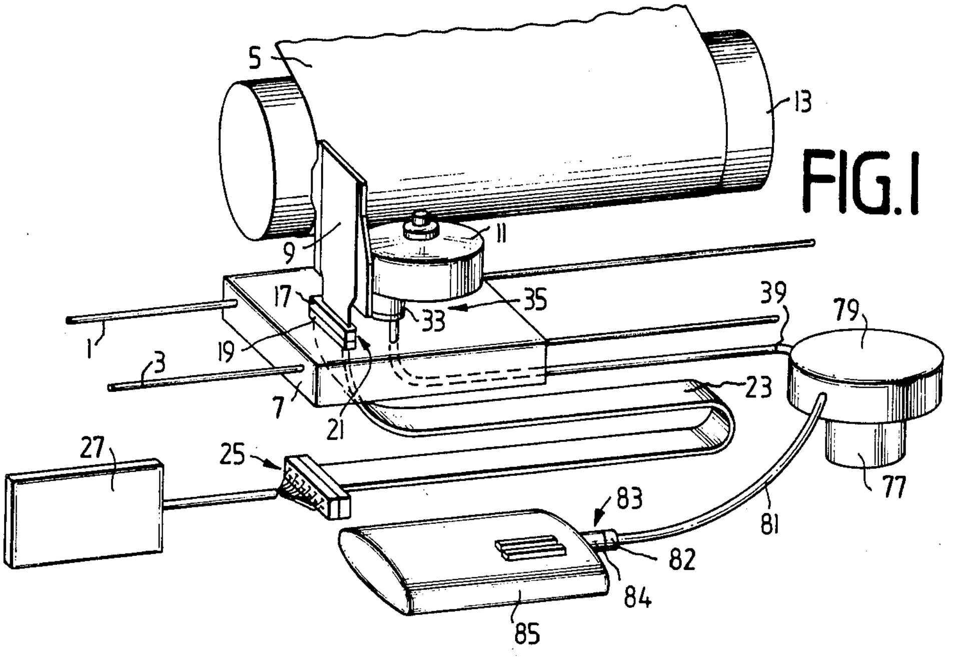
FIG.1
FIG.3
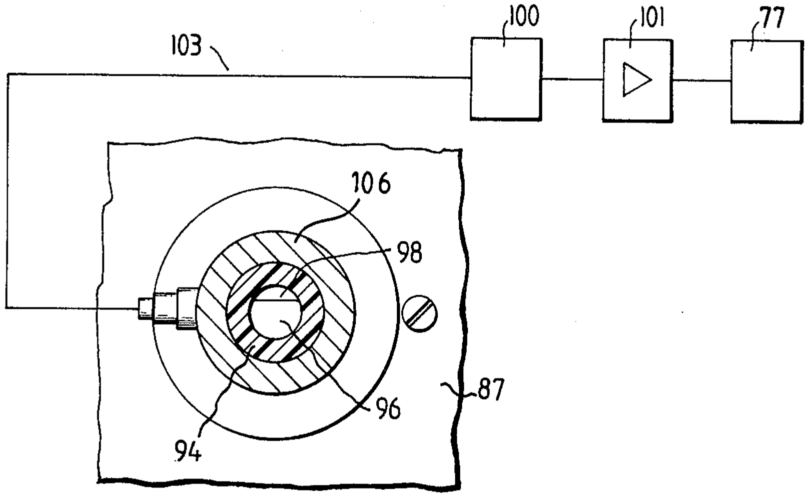

INK PRINTER EQUIPPED WITH AN INK PRINTING HEAD AND INTERMEDIATE INK CONTAINER DISPOSED ON A MOVABLE CARRIAGE

BACKGROUND OF THE INVENTION

The present invention relates to an ink printer equipped with a carriage movable along a record carrier and, in particular, to an ink printer in which an ink printing head and an intermediate container are mounted on the carriage.

In the operation of ink mosaic printers, it is necessary to supply ink continuously to the printing head. This is accomplished in known apparatus by placing an ink reservoir at a stationary location near the printer and by mounting the printing head on a carriage which moves along the line being printed. Ink is fed through a flexible tube from the reservoir to the printing head.

This arrangement has the advantage that the reservoir can have a relatively large capacity without the moving printing head being subjected to a significant additional load. However, with the rapid carriage accelerations and decelerations inherent in an ink printer, pressure and suction surges occur in the flexible line, and these surges are transmitted to the printing head. As a result, there is interference with the formation of the ink drops and impairment of the quality of the printed material. Such malfunctions may also cause interruptions in the operation of the printing head.

To overcome such difficulties, the ink reservoir may be carried on the printing head as it travels along the printed line on the record carrier, as disclosed in U.S. Pat. No. 3,967,286. However, with this arrangement, the inertial masses that must be accelerated and decelerated alternatingly on the carriage during the printing process are increased, and these inertial masses change as the ink reservoir is depleted so that different acceleration and deceleration conditions exist depending upon the amount of ink in the reservoir. Accordingly, the ink reservoir carried along with the printing head must be relatively small.

U.S. Pat. No. 3,771,165 discloses an ink supply for an ink printer wherein the printing head is supplied with ink from a stationarily mounted ink vessel connected by a flexible line to an auxiliary reservoir mounted on a movable pen-carriage of a recorder. However, the auxiliary reservoir is not a storage vessel but rather functions as an attenuation chamber. In supplying curve recording devices, this arrangement sufficiently attenuates pressure and suction surges during acceleration and deceleration but does not absorb increases or decreases in pressure of longer duration; that is, the patented arrangement does not relieve the printing head of movement-dependent changes in pressure.

Likewise, in German Offenlegungsschrift No. 2,336,485 an ink printer is disclosed which has a stationary primary ink reservoir. When the printing head is at one end of the line being printed, the primary ink reservoir is connected by a plug-in coupling to an intermediate reservoir disposed at the printing head and moving with it along the printed line. By means of a valve system, the ink supply required for at least one line is transferred under pressure from the stationary ink reservoir to the intermediate reservoir. Since the amount of time available for replenishing the ink in the intermediate container is relatively short during the regular printing operation, the ink transfer can take place only at a very high ink pressure. This high ink pressure is propagated into the region of the printing head and has an adverse effect on the operation of the printer.

German Offenlegungsschrift No. 2,742,633 discloses a vessel having a cavity containing an elastic membrane which subdivides the vessel into two chambers. One of the chambers contains an ink-filled bag which is provided with a connecting pipe stub forming a passage for the ink. The other chamber is in communication with the atmosphere via an opening in the vessel housing. This vessel permits pressure equalization between the cavity and the surrounding atmosphere and in the event of a leak, prevents the escape of ink through the air hole. However, the vessel is not suitable for use on a moving carriage nor is it provided with means for attenuating and controlling a replenishing pump.

It is an object of the present invention to provide an ink printer having an exchangeable printing head and an intermediate ink container disposed on a movable carriage. The intermediate ink container is in flow-connection with the printing head so that an automatic and free replenishment of ink is obtained. The ink, which is free of gas bubbles, is transferred through an inlet channel from a stationary reservoir.

SUMMARY OF THE INVENTION

In accordance with the present invention, a printing apparatus is provided which comprises a carriage that is movable along a record carrier, an ink printing head for applying ink to the record carrier, and a stationary reservoir mounted adjacent the carriage for storing ink to be applied to the carrier. An intermediate container which, together with the ink printing head, is attachable to the carrier is flow connected to the ink printing head for supplying ink obtained from the reservoir. The intermediate container includes a hollow housing having upper and lower portions defining an ink storage chamber and a bladder containing air which is suspended within the ink storage chamber, the interior of the bladder being connected to the atmosphere through an opening in the housing.

In the non-printing state, the bladder in the ink chamber serves as a volume buffer when the liquid and the vessel expand differently due to differences in temperature. The configuration and arrangement of the bladder assure that it is insensitive to pressures generated during replenishment and during rinsing. The bladder serves as an attenuator and volume equalizer, with the decreasing ink volume during printing being compensated for by an increase in the size of the bladder.

In one embodiment of the invention, the bladder also serves to indicate that the ink supply is low and to control a pump for replenishing ink from the reservoir into the ink chanber of the intermediate ink container. Moreover, means are provided to assure that no air bubbles can attach themselves to the wall of the ink chamber but are instead carried along in the bubble collecting chamber.

BRIEF DESCRIPTION OF THE DRAWINGS

FIG. 1 is a diagrammatic view of an ink printer equipped with a device in accordance with the invention.

FIG. 3 is a combination cross-sectional and schematic view taken along the line III—III of FIG. 2.

DESCRIPTION OF THE PREFERRED EMBODIMENT

Figure 2:
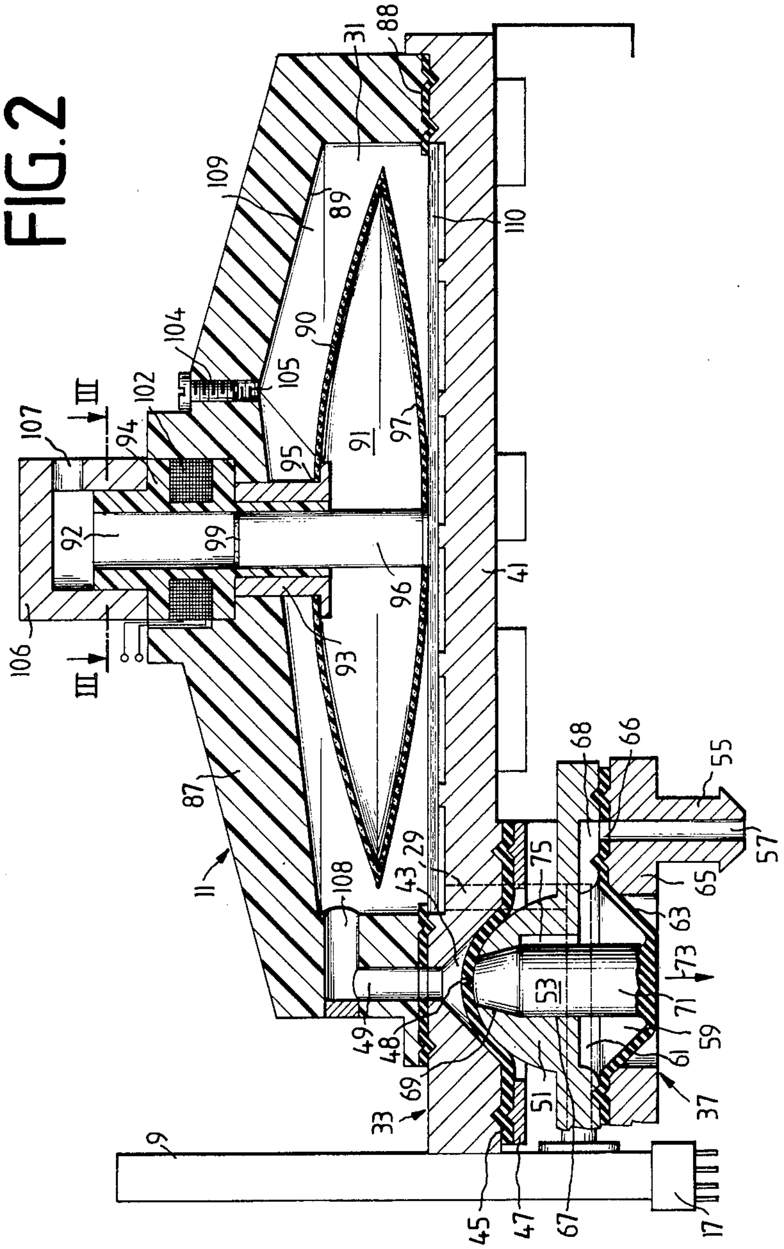
FIG. 2 is an enlarged cross-sectional view of the intermediate ink container shown in FIG. 1.

Referring to FIG. 1, an ink printer is shown which comprises a carriage 7 that travels on rails 1 and 3 along a record carrier 5. An ink mosaic printing head 9 and an intermediate ink container 11 are removably disposed on the carriage 7, the record carrier 5 being movable over a platen 13 driven by a stepping motor (not shown). During intervals between printing, the ink printing head 9 is moved into a housing and cleaning station (not shown) disposed outside the printing region for the insertion of a new record carrier 5 and for the purpose of cleaning the nozzle surfaces of the printing head as described in U.S. Pat. No. 4,144,537.

The ink printing head 9 and the intermediate ink container 11 form a replaceable unit, with the ink printing head 9 being provided with one coupling half 17 and the carriage 7 with a mating coupling half 19 of an electrically actuated coupler 21. The coupling half 19 of the coupler 21 attached to the carriage 7 is connected, by means of a printed wire connection 23 and a further electrical coupling device 25, to a control element 27. Control element 27 transmits control pulses via the printed wire connection 23 to piezoelectric elements disposed in the printing head 9 to cause individual ink droplets to be ejected in a known asynchronous manner from the discharge nozzles of pressure chambers within the head. The printing head 9 and its control element 27 are known devices as described in U.S. Pat. No. 3,871,004, issued Mar. 11, 1975 and in U.S. Pat. No. 3,747,120, issued July 17, 1973.

Ink mosaic printing heads require that their chambers be replenished with ink to replace the ink ejected in the form of the droplets which provide the mosaic printed characters on the record carrier 5. For this purpose, the ink printing head 9 is connected by a channel 29 (FIG. 2) to an ink chamber 31 in the intermediate ink container 11.

A hydraulic coupling 35 having a coupling half 37 secured to the carriage 7 and a coupling half 33 attached to the intermediate ink container 11 is provided. When the hydraulic coupling 35 is actuated, ink is supplied to the container 11 from an ink supply hose 39. Coupling half 33 is integral with a bottom plate 41 of the intermediate ink container 11, bottom plate 41 having a conical recessed opening 43 and an elastic sealing membrane 45 that closes the wide portion of the opening with an airtight seal.

The sealing membrane 45 is connected to the bottom plate 41 by means of a clamping ring 47 in such a manner that, in the decoupled state of the intermediate container 11, the membrane 45 is under tension and disposed just in front of the opening 43. The elastic sealing membrane 45 has a slit 48 which automatically closes and opens during the coupling process, the widened opening of the membrane being in flow-connection via channel 49 with chamber 31.

Coupling half 37, which is rigidly attached to the carriage 7, has a hemispherical member 51 with which the sealing membrane 45 is pressed during the coupling process against the conical surface defining opening 43. The slit 48 in the sealing membrane 45, which is pressed against the face of hemispherical member 51, is expanded in front of an opening in valve 53 in the hemispherical member 51, and any air present in the coupling area is urged outwardly through the opened slit. This prevents the entrance of air into the gas or liquid filled channel 49.

The connecting pipe end 55 which is coupled to the ink hose 39 is provided with a channel 57 in flow connection, via a bore 66 and a channel 68, with a chamber 59 in the coupling half 37. Chamber 59 includes a recess 61 disposed below the hemispherical member 51 and a membrane 63 sealing the recess. Membrane 63 is fixed to the hemispherical member 51 by a clamping ring 65 forming part of coupling half 37.

Recess 61 includes an outlet channel 67 which has a conical bore 69 that is tapered toward the opening in the hemispherical member 51 and in which a conical pin 71 guided in the outlet channel 67 is positioned. The conical pin 71 and the membrane 63 are made of one piece, with the membrane 63 being tensioned in such a manner that the pin 71 can be securely pressed into the conical bore 69, pin 71 forming part of valve 53.

If the pressure in chamber 59 is increased by the pumping pressure in channel 57, the membrane 63 and the conical pin 71 are moved downwardly in the direction of arrow 73. This opens valve 53 and permits ink to be forced through a flow gap in conical bore 69, the widened slit 48 in membrane 45 and through channel 49 into chamber 31 of the intermediate ink container 11. If the pumping pressure in chamber 59 of the coupling half 37 decreases, valve 53 closes automatically, the tension in membrane 63 being less than the force exerted by the operating pressure. The flow of ink from chamber 59 is enhanced by a compensating bore 75 in outlet channel 67.

Valve 53 in coupling 37 opens and closes automatically with changes in the pressure in chamber 59. The membrane 45 which acts as a valve in coupling half 33 is closed automatically when the intermediate ink container 11 is removed and is opened again when the container is replaced. The leakage free connection of the two coupling halves 33 and 37 of the hydraulic coupling 35 is thus effected without additional adjusting means for opening and closing the channels. This coupling is described in greater detail in copending application Ser. No. 417,897, filed Sept. 14, 1982 and assigned to the same assignee as the present invention.

The ink supply hose 39 is connected with a pump 79 driven by a motor 77. Pump 79 is in flow connection, via a line 81 and a hydraulic coupling 83, with a stationary ink reservoir 85. The configuration of the coupling halves 82 and 84 of the hydraulic coupling 83 is similar to that of the coupling halves 33 and 37 of the hydraulic coupling 35.

The ink chamber 31 in the intermediate ink container 11 is formed by a cylindrical recess in a cover 87 which is fixed to the bottom plate 41, a sealing membrane 88 being disposed between the cover 87 and the bottom plate 41. A bladder 90 is suspended from the upper portion 89 of the ink chamber 31, the interior 91 of this bladder being connected, via an air opening 92, with the atmosphere in such a manner that the volume of air in the bladder 90 automatically adapts itself to the volume of ink in the ink chamber 31.

A collar 93 projects from an opening 95 in bladder 90 and is fixed to an insert 94 concentrically mounted in cover 87, the air opening 92 disposed in the insert 94 opening into the interior of bladder 91. A sensor pin 96 is movably mounted within the cylindrical air opening 92 and rests on the movable bottom 97 of the bladder 90 due to its own weight. The sensor pin 96 is provided with a flattened portion 98 (FIG. 3) through which air can flow into and out of the interior of the bladder 91. The upper end 99 of the sensor pin 96 cooperates with an interrogating element which emits control pulses via a motor control unit 100 and an amplifier 101 to the motor 77 for pump 79, as shown in FIG. 3.

The interrogating element includes an induction coil 102 which is arranged concentrically around the air opening 92 in the insert 94. The induction coil 102 is connected via a line 103 with the motor control unit 100, which includes a microprocessor, 120 (FIG. 4) which may be a type 8080 manufactured by Intel Corporation, Santa Clara, Calif. The control unit 100 controls the motor 77 for the pump 79 in accordance with the amount of ink in the ink chamber of the intermediate ink container 11 in such a manner that sufficient ink is always available to flow into the ink printing head 9. Bladder 90 has the shape of a discus and is made, for example, of butyl rubber.

Figure 4:
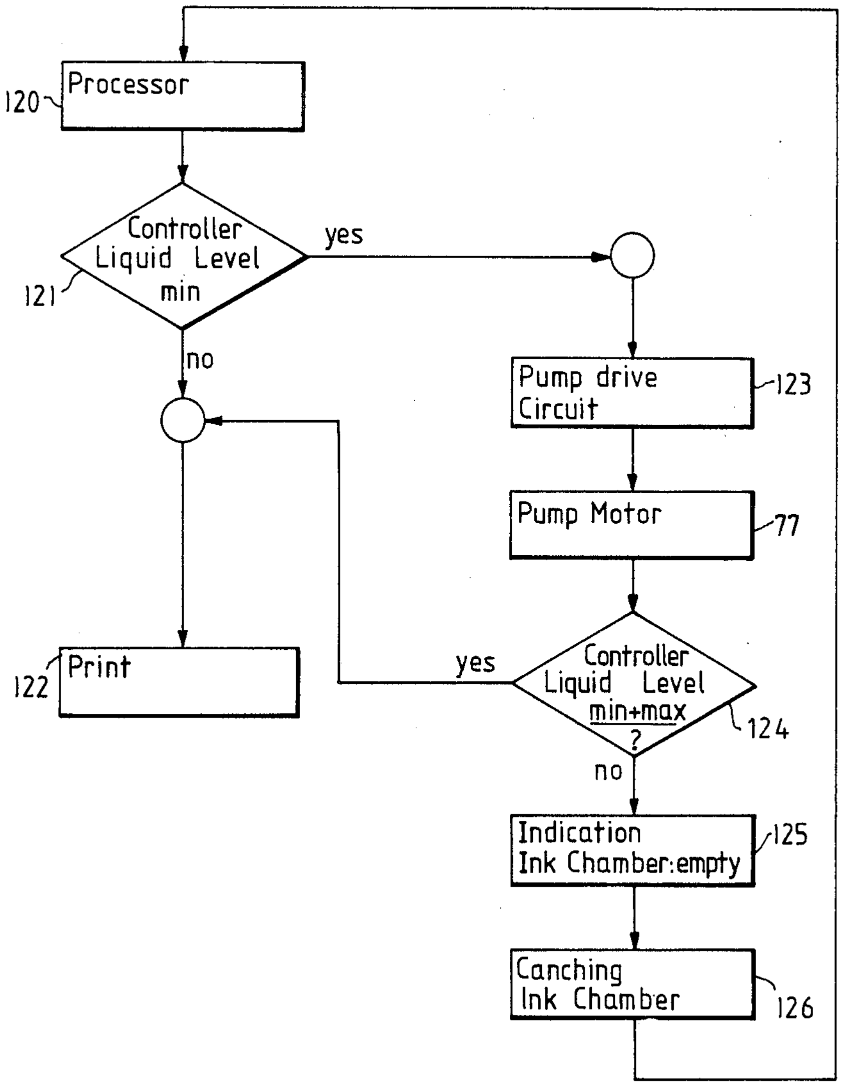
FIG. 4 comprise a flow diagram of the program executed by the processor.

FIG. 4 comprise a flow diagram of the program executed by the microprocessor 120. The processor 120 transfers periodically a signal to controller 121 which checks the voltage producing by moving the sensor pin 96 in the cylindrical air opening 92 of the induction coil 102. A high-ink level in the ink container 11 produces a high voltage. When the ink level falls in the ink container 11 the voltage becomes smaller. The controller 121 sends a signal to Block 122 "Print", when the ink level is higher than min ink level. When the ink level is lower than the min ink level the controller 121 sends a signal to pump drive circuit 123. Then the motor 77 of the pump 79 will be switched on for one revolution. When the motor 77 reaches the output position, the controller 124 checks the ink level. When the ink level is higher than $$\frac{\text{min} + \text{max}}{2},$$

the printer is ready for printing. When the ink level is smaller than $$\frac{\text{min} + \text{max}}{2},$$

the controller 124 gives a signal to indicate the empty of ink chamber—Block 125. After changing the ink chamber 126 a signal is given to processor 120.

A ventilating hole 105 that can be closed by a screw 104 is eccentrically disposed in the cover 87 of intermediate container 11. The ventilating hole 105 is disposed at the highest point of ink chamber 31 with the upper portion 89 of the cover being sloped away from the hole. To prevent the sensor pin 96 from falling out of the air hole 92 and dirt entering the interior of the bladder 91, the insert 94 is provided with a cap 106 having a ventilation hole 107 in its side.

Ink is supplied, with valve 53 open, through channel 49 which abuts perpendicularly on a bore 108 in cover 87. Bore 108 opens tangentially into the region of the cover 87 of the ink chamber 31 so that air bubbles are prevented from developing along the walls of the ink chamber and instead move directly into a bubble collecting chamber 109 which has the ventilation hole 105. The entrance of gas bubbles into the ink printing head 9 is also prevented by a filter 110 disposed in front of the outlet channel 29 in the bottom plate 41 of the intermediate container 11.

The bladder 90 serves as a volume compensator with the reduced ink volume in ink chamber 31 during printing being compensated by an increase in the size of bladder 90. The inherent tension in bladder 90 is in part compensated by the weight of sensor pin 96 but is still high enough to provide the desired compensation. The discus type design of bladder 90 prevents sudden pressure fluctuations in ink chamber 31, which may develop in the ink chamber during replenishing or transporting of ink, from being transferred to the ink printing head 9 resulting in a malfunction of the head.

It will be understood that the above description of the present invention is susceptible to various modifications, changes and adaptations, and the same are intended to be comprehended within the meaning and range of equivalents of the appended claims.

What is claimed is:

1. A printing apparatus comprising a carriage which is movable along and adjacent to a record carrier;

an ink printing head for applying ink to said record carrier, said ink printing head being attachable to said carriage;

a stationary reservoir mounted adjacent said carriage for storing ink to be applied to said record carrier;

an intermediate container flow connected to said ink printing head for supplying ink thereto, said intermediate container being attachable to said carriage and including a holllow housing having upper and lower portions defining a chamber for storing ink therein, the volume of ink in said chamber changing when the ink is depleted during printing and when it is replenished from said stationary reservoir, said housing being provided with an opening in the upper portion thereof connected to the atmosphere; and an expandable and deflatable storage bladder suspended within said ink chamber and having its interior coupled to the atmosphere by means of the opening in said housing, the volume of air within said bladder automatically changing as a function of the volume of ink in said chamber when the ink in said chamber is depleted during printing and when it is replenished from said reservoir; and means coupling said stationary reservoir to said intermediate container for supplying ink under pressure to said container.

2. A printing mechanism as defined in claim 1 wherein said bladder has an aperture therein, and which further comprises a tubular collar positioned within the opening in said housing and a cylindrical insert positioned within said collar, said bladder being suspended within said ink storage chamber from said insert.

3. A printing mechanism as defined in claim 1 or 2 wherein the interior of said bladder has a movable bottom portion, and which further comprises a sensor pin movably mounted within the opening in said housing, the lower end of said sensor pin being in constant contact with the movable bottom of the interior of said bladder; a pump disposed between said reservoir and said intermediate container; and an interrogating element located within the opening of said housing and coupled to said sensor pin for determining the position thereof, the output of said interrogating element being coupled to said pump for the control thereof.

4. A printing mechanism as defined in claim 3 wherein said interrogating element comprises an induction coil surrounding said sensor pin, said induction coil generating a signal corresponding to the position of said pin; and which further comprises a control unit coupling said induction coil to said pump, said control unit switching said pump on or off as a function of the amount of ink in the ink chamber of said intermediate container.

5. A printing mechanism as defined in claim 4 wherein said induction coil surrounds said cylindrical insert.

6. A printing mechanism as defined in claim 1 or 2 wherein said ink storage chamber is cylindrical and said bladder has the shape of a discus.

7. A printing mechanism as defined in claim 6 wherein said housing is further provided with an ink entry nozzle oriented in a direction tangential to said cylindrical ink storage chamber, said nozzle being located between the upper surface of said bladder and the upper end of the chamber in said intermediate container.

8. A printing mechanism as defined in claim 7 wherein the upper portion of said housing is provided with a closable ventilation hole for said ink storage chamber, said ventilation hole opening into said chamber at its highest point.

9. A printing mechanism as defined in claim 8 wherein the surface of the upper portion of said housing slopes away from said ventilation hole.

10. A printing mechanism as defined in claim 1 or 2 wherein said intermediate container is coupled to said ink printing head by a flow channel located in the lower portion of said housing; and wherein said housing is provided with a filter at the lower portion thereof to prevent air from entering said ink printing head.

11. A printing mechanism as defined in claim 1 or 2 wherein said bladder is made of butyl rubber.

* * * * *